3,322,634
METHOD OF BONDING PROTEIN ANTIGEN TO MAMMALIAN RED BLOOD CELLS
Arthur James Fulthorpe, London, England, assignor to Burroughs Wellcome & Co. (U.S.A.) Inc., Tuckahoe, N.Y., a corporation of New York
No Drawing. Filed May 29, 1963, Ser. No. 283,980
Claims priority, application Great Britain, June 6, 1962, 21,976/62; Aug. 22, 1962, 32,345/62; Republic of South Africa, Jan. 7, 1963, 63/72
3 Claims. (Cl. 167—84.5)

This invention relates to the production of immunological reagents for use in a haemagglutination test. These reagents comprise antigen-sensitised mammalian red blood cells which agglutinate in the presence of corresponding antibody. The agglutinated cells also can disagglutinate in the presence of further free antigen. These reactions can be used to detect protein antigens, for example in body fluids. Among such antigens are chorionic gonadotropin (HCG), serum albumin, $\gamma$-globulin, insulin, tetanus toxoid and diphtheria toxoid. When used to detect HCG in pregnancy urine, the reaction forms the basis of an in vitro test for pregnancy.

The red cells used are conveniently those obtained from the sheep, but cells of other mammalian species, including the ox, horse, rabbit and man may be used.

In an existing method for preparing antigen-sensitised red cells, the cells are first preserved by treatment in an aqueous medium with an aldehyde, usually formaldehyde although other aldehydes such as acetaldehyde and pyruvic aldehyde may be used. The cells are then carefully washed free of the aldehyde, and treated in an aqueous medium with a mordant (bonding agent) which traditionally is tannic acid. Excess mordant is removed and the cells are finally sensitised by treatment in an aqueous medium with the selected antigen, for example HCG. Throughout this procedure, the amount of washing required is troublesome when the preparation is carried out on a large scale, and tannic acid is also a somewhat unsatisfactory mordant.

It has now been found that antigen-sensitised cells can reliably be produced using a polyphenol or quinone of low molecular weight (under 200) as the mordant. Such a mordant is preferably added to fresh cells before adding the aldehyde, although adequate results can be obtained in certain circumstances by adding the aldehyde before the mordant or by adding a mixture of the mordant and the aldehyde to the red cells. It may be necessary to have a buffer present to minimise any fall of pH occurring on mixing the mordant with the aldehyde. Cells thus treated can be sensitised with an antigen after relatively brief washing. They are relatively stable and can be stored for many days if necessary until required for sensitising with an antigen.

Among the mordants that can be used according to the invention are hydroquinones (cross-conjugated aromatic diols capable of oxidation to quinones) including benzene-1,4-diol, toluene-2,5-diol and the naphthalene -1,4- and -2,6- diols, as well as the corresponding quinones, and also the other benzenediols, toluenediols and naphthalenediols.

The amount of the mordant needed rises as the amount of the aldehyde used is increased. The mordant and the aldehyde are preferably used in a molar ratio between 1:5 and 1:150. With sheep red cells, for example, at least 0.8% w./v. formaldehyde is required to preserve the cells, when the concentration of benzene-1,4-diol must be less than 0.5% w./v. With 2.0% w./v. formaldehyde, benzene-1,4-diol must be less than 2.0% w./v.; and with 4.0% formaldehyde, benzene-1,4-diol can be as low as 0.1% w./v. and is optimally 0.5–1.0% w./v. Such red cells when sensitised with human chorionic gonadotropin give a product of uniform and reproducible titre.

The sensitised cells are conveniently presented freeze-dried, either separately or in combination with an equivalent amount of antiserum. A water soluble excipient (conveniently a sugar such as sucrose) is used to preserve the integrity of the cells during the free-drying process, and helps to redisperse them rapidly when an aqueous medium is added. Before use, freeze-dried preparations are reconstituted in the aqueous medium in which the test is to be carried out.

The following examples illustrate the invention. The preparation of two buffer solutions used is described below.

*Borate/succinate buffer pH 7.5.*—Sodium borate $Na_2B_4O_7 \cdot 10H_2O$ (95.5 g.) and sodium chloride (37.5 g.) were dissolved in distilled water (5 litres). Succinic acid (23.6 g.) and sodium chloride (30.0 g.) were dissolved in distilled water (4 litres). Equal volumes of the two solutions were mixed and the pH was adjusted to 7.5 by adding a small volume of the sodium borate solution.

*Borate buffer pH 8.2–8.3.*—A mixture of sodium borate $Na_2B_4O_7 \cdot 10H_2O$ (3.0 g.), boric acid $H_3BO_3$ (4.4 g.) and sodium chloride (7.6 g.) was dissolved in distilled water (1 litre).

*Example 1*

Fresh sheep red blood cells were washed 3 times with 20 volumes of physiological saline and made up as a 1% suspension in 5% sodium chloride solution containing 0.15% of benzene-1,4-diol and buffered to pH 7.0 with 0.15 M phosphate. The suspension was allowed to stand for 15 minutes at room temperature. To 10 volumes of the suspension was added 1 volume of formalin (commercial 40% w./v. formaldehyde solution). The mixture was left for 18 hours at room temperature. The cells were then centrifuged down and resuspended at 1% in borate/succinate buffer.

The red cells from the litre of the 1% suspension were then washed 3 times in physiological saline and resuspended in 200 ml. of edetate buffer (0.05 M disodium dihydrogen ethylenediaminetetracetate brought to pH 8.4 by adding 2 N sodium hydroxide). Purified HCG (Leo), 3500 international units in 3 ml. of edetate buffer, was added. The mixture was incubated at 37° C. for 4 hours with occasional stirring. The cells were then washed four times with 100 volumes of borate/succinate buffer.

The sensitised cells were resuspended in 100 ml. of borate/succinate buffer containing 10% w./v. sucrose. To this was added 80 ml. of borate/succinate buffer and 20 ml. of rabbit serum containing sufficient antibody to HCG to cause complete agglutination of the sensitised cells. The added rabbit serum consisted of the required quantity (estimated by calculation from the antibody titre) of an antiserum obtained from rabbits challenged with purified HCG, plus a quantity of normal rabbit serum to make up the total of 20 ml.

The agglutinated suspension was dispensed in 1 ml. amounts into 5 ml. ampoules and freeze-dried in the conventional manner.

For use in an in vitro test for pregnancy, an ampoule of freeze-dried reagent and a control ampoule (containing preserved unsensitised cells treated with normal rabbit serum only and freeze-dried) were each reconstituted into suspensions of 5 ml. with borate buffer. The sample of human urine to be tested for HCG was clarified by centrifugation and diluted with borate buffer. Dilutions of 1/2, 1/5, 1/10, 1/20 and 1/200, as well as a control of buffer alone, were pipetted in 1.0 ml. amounts into two rows of round-bottomed glass tubes (preferably of 0.195 cm. x 7.6 cm. dimensions) in a suitable holding rack. The reconstituted reagent suspension was added in 0.1 ml. amounts to each tube in the first row and the control suspension similarly to each tube in the second row. The contents were mixed by shaking or inverting the tubes, and the mixtures were left to stand overnight at room temperature free from draughts and vibration. The result of the test was read the following morning by observing the pattern of agglutination on the bottom of the tubes. Of the controls with buffer only and no urine, that with the reagent suspension was fully agglutinated and that with the control suspension was unagglutinated. If HCG was present in the urine, the reagent suspension in the tubes beginning at the 1/2 dilution was disagglutinated and had the appearance of the unagglutinated controls. The titre of the urine sample was expressed as the dilution of the sample in the last tube in which definite disagglutination of the reagent suspension was observed. Occasionally at dilutions of 1/2 or 1/5 both the reagent and control suspensions were agglutinated; this indicated the presence of a non-specific agglutinin in the urine. If only small amounts of HCG were present in the urine, this non-specific agglutination could mask the disagglutination reaction and make it necessary on rare occasions to repeat the test with a fresh sample of urine.

The results of pregnancy tests on samples of urine from 127 clinically diagnosed pregnancies, tabulated according to the duration of the pregnancy (weeks), are shown in Table 1. With the exception of one of the cases that gave a negative result and was found on clinical re-examination not to be pregnant, all these pregnancies were later confirmed. The results, all negative, of tests on 211 non-pregnant women, tabulated according to age groups (years), are shown in Table 2.

TABLE 1.—CLINICALLY DIAGNOSED PREGNANCIES

| Pregnancy duration | Test Results | |
|---|---|---|
| | Positive | Negative |
| 6-8 | 15 | 0 |
| 9-12 | 39 | 1 |
| 13-16 | 33 | 2 |
| 17-20 | 8 | 0 |
| 21-24 | 7 | 0 |
| 25-28 | 14 | 0 |
| >28 | 8 | 0 |

TABLE 2.—NON-PREGNANT WOMEN

Age group: Number of women
17-20 _____ 41
20-30 _____ 56
30-40 _____ 23
40-50 _____ 37
>50 _____ 54

*Example 2*

Similarly satisfactory reagents were prepared by modifying the procedure of Example 1. The concentration of benzene-1,4-diol was increased from 0.15% to 0.5% and 1.0%, and the suspensions were allowed to stand for 15 to 30 minutes before adding the formalin and for 18 hours to 4 days thereafter. The time of incubation with HCG was shortened from 4 hours to 1.5 hours, and the sensitised cells were then washed five times with 100 volumes of borate/succinate buffer.

*Example 3*

Fresh sheep red blood cells were washed 3 times with 20 volumes of physiological saline. The packed washed cells (100 ml.) were added to 500 ml. of a solution of benzene-1,4-diol (2.5 g.) in 5% sodium chloride buffered to pH 7.0 with 0.15 M phosphate. The suspension was allowed to stand for 15 minutes at room temperature. To it was added 500 ml. of a solution of paraformaldehyde (40 g.) in 5% sodium chloride buffered to pH 7.0 with 0.15 M phosphate. The mixture was left at room temperature for about 24 hours.

The cells from 500 ml. of the suspension were washed 3 times in physiological saline and were resuspended in a solution of human γ-globulin (250 mg.) in one litre of edetate buffer pH 8.4 (made by mixing 0.05 M disodium dihydrogen ethylenediamine-tetracetate and 0.5 M disodium hydroxide). The mixture was incubated for one hour at 37° C. The cells were then washed 3 times with 20 volumes of physiological saline and were resuspended in one litre of borate/succinate buffer containing 5% sucrose and 5% normal rabbit serum, the serum being previously absorbed with hydroquinone-formaldehyde-treated sheep red cells. The suspension was dispensed in 1 ml. amounts into 5 ml. ampoules and freeze-dried in the conventional manner.

An antiserum, obtained from rabbits challenged with human γ-globulin, was suitably diluted and freeze-dried, so that on reconstitution it had an agglutinin titre of about 1 in 200.

A standard human serum preparation of known γ-globulin content was suitably diluted and freeze-dried, so that between 0.2 ml. and 0.4 ml. of the reconstituted preparation was equivalent to 0.5 ml. of the antiserum.

For use, an ampoule of the freeze-dried sensitised-cell reagent was reconstituted into a suspension of 5 ml. with borate buffer. The freeze-dried antiserum and standard γ-globulin preparations were similarly reconstituted. A human serum, of which the γ-globulin content was to be determined in the test, was serially diluted with borate buffer, as was the standard γ-globulin preparation. By comparison of the minimum volumes of the tested serum and the standard γ-globulin preparation that were required to inhibit agglutination of the sensitised cells by 0.5 ml. of the antiserum, the γ-globulin content of the tested serum was calculated. No agglutination occurred in the absence of the antiserum or in controls using unsensitised cells, while complete agglutination of the sensitised cells occurred in the presence of the antiserum but absence of the γ-globulin preparation.

*Example 4*

A reagent similar to those of Examples 1 and 2 was made by the procedure described in Example 3 but using benzene-1,4-diol at a final concentration of 1.0% w./v. and sensitising the cells with HCG as described in Example 2.

*Example 5*

Using procedures similar to those of Example 1, sheep red blood cells were treated with 1.0% w./v. solutions of benzene-1,4-diol, benzene-1,3-diol, benzene-1,2-diol and 1,4-benzoquinone, and the products were all sensitised with bovine serum albumin to give satisfactory reagents for observing the immunological reaction of bovine serum albumin and a corresponding rabbit antiserum.

What I claim is:

1. The method of bonding a protein antigen to a mammalian red blood cell, comprising treating the red blood cells with a bonding agent selected from the class consisting of phenols and quinones of molecular weight under 200, and then adding a protein antigen to the red blood cells thus treated by the bonding agent.

2. The method of claim 1, wherein the bonding agent is selected from the class consisting of benzene diols, toluene diols, naphthalene diols and quinones of molecular weight under 200.

3. The method according to claim 1, wherein the bonding agent is selected from the class consisting of benzene-1,4-diol, benzene-1,3-diol, benzene-1,2-diol, 1,4-benzoquinone, quinone, toluene-2,5-diol, naphthalene-1,4-diol and naphthalene-2,6-diol.

References Cited

Chemical Abstracts, vol. 46, entry 9207i, 1952 citing Hockerts, Monatsschr, Kinderheilk 100, 195–6 (1952).

Fulthorpe et al., J. Clin. Path., vol. 14, pp. 654–660, 1961.

LEWIS GOTTS, *Primary Examiner*.

RICHARD L. HUFF, *Assistant Examiner*.